(12) United States Patent
Allen et al.

(10) Patent No.: US 9,450,758 B1
(45) Date of Patent: Sep. 20, 2016

(54) VIRTUAL REQUESTS

(75) Inventors: Nicholas Alexander Allen, Seattle, WA (US); Gregory B. Roth, Seattle, WA (US); Elena Dykhno, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 513 days.

(21) Appl. No.: 13/418,270

(22) Filed: Mar. 12, 2012

(51) Int. Cl.
*H04L 29/06* (2006.01)
*H04L 9/32* (2006.01)

(52) U.S. Cl.
CPC ........... *H04L 9/3202* (2013.01); *H04L 63/166* (2013.01)

(58) Field of Classification Search
USPC .................................. 713/155–157
See application file for complete search history.

(56) References Cited

U.S. PATENT DOCUMENTS

| | | | |
|---|---|---|---|
| 6,728,716 B1 | 4/2004 | Bhattacharya et al. | |
| 6,799,210 B1 | 9/2004 | Gentry et al. | |
| 7,171,684 B1 | 1/2007 | Marquet et al. | |
| 2002/0116637 A1 | 8/2002 | Deitsch et al. | |
| 2003/0005286 A1* | 1/2003 | McGarvey | 713/155 |
| 2003/0065620 A1 | 4/2003 | Gailey et al. | |
| 2003/0212892 A1* | 11/2003 | Oishi | 713/168 |
| 2004/0093515 A1 | 5/2004 | Reeves, Jr. et al. | |
| 2007/0136283 A1 | 6/2007 | Silverbrook et al. | |
| 2008/0046984 A1 | 2/2008 | Bohmer et al. | |
| 2008/0134311 A1* | 6/2008 | Medvinsky | G06F 21/33 726/7 |
| 2009/0119504 A1* | 5/2009 | van Os et al. | 713/153 |
| 2010/0085907 A1 | 4/2010 | Yasumoto et al. | |
| 2012/0036364 A1* | 2/2012 | Yoneda | H04L 9/30 713/175 |
| 2012/0036365 A1 | 2/2012 | Kyslov et al. | |
| 2012/0077461 A1* | 3/2012 | Das | H04L 63/0884 455/410 |
| 2012/0079268 A1* | 3/2012 | Zhong et al. | 713/156 |
| 2012/0281706 A1 | 11/2012 | Agarwal et al. | |
| 2013/0151400 A1 | 6/2013 | Makhotin et al. | |
| 2013/0227291 A1* | 8/2013 | Ahmed | H04L 63/0281 713/171 |
| 2014/0164617 A1 | 6/2014 | Jalan et al. | |
| 2014/0245422 A1 | 8/2014 | Gargett et al. | |

OTHER PUBLICATIONS

U.S. Appl. No. 13/418,230, filed Mar. 12, 2012, titled: Virtual Requests.
U.S. Appl. No. 14/181,078, "Non-Final Office Action", May 22, 2015, 18 pages.

* cited by examiner

*Primary Examiner* — Joseph P Hirl
*Assistant Examiner* — Chi Nguy
(74) *Attorney, Agent, or Firm* — Kilpatrick Townsend & Stockton LLP

(57) ABSTRACT

A first request from a client using a first protocol is translated into one or more second requests by a servicer using a second protocol through a virtual request using the first protocol. A client may use parameters of the first protocol to pass virtual request components to the servicer. A format agreement between the client, servicer and/or authentication service may allow the servicer and/or authentication service to translate the virtual request components over the first protocol to one or more second requests using the second protocol. Virtual request components may prove the authenticity of the virtual request received by the servicer to an authentication service. Once satisfied the virtual request is valid, the authentication service may issue a credential to the servicer to send the one or more second requests to an independent service. Virtual requests may be included in various protocols, including credential-based protocols and certificate exchange-based protocols.

19 Claims, 10 Drawing Sheets

US 9,450,758 B1

VIRTUAL REQUESTS

BACKGROUND

Legacy applications and changing environments can make it difficult to adapt interoperating programs to new versions and environments. In some cases, a legacy program may depend on a first protocol while a support system may move to a second protocol. For example, a legacy program may be a website management system and the support system may be a virtual machine management system. The first protocol may have drawbacks, such as dependence on an outdated and/or easily compromised protocol. For example, it may be discovered that a legacy application uses HTTP basic authentication and HTTP POST actions where credentials are sent in plaintext and easily intercepted. A support system for the application may move to an application programming interface (API) over transport layer security (TLS) for greater security. In some cases, a legacy request may be directly translated by a trusted entity. For example, an old website management system may be configured to place requests for virtual machine starting and stopping through a first version of an API that may be directly translated to a second version of an API by a trusted service provider.

However, there may be problems with direct translation of a protocol by a trusted entity. For example, traditional security models for request delegation may include a highly privileged trust relationship between the services. This trust may undermine the intent for the services to be independent. In another example, not all protocols may be directly translated. There may not be a direct mapping from a first protocol to a second protocol. While various techniques have been employed to effectively adapt interoperating programs to new program versions and environments, due to the complexity of the tasks, the employed techniques are of varied success.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include translating a first client request from using a first protocol into one or more second requests by a servicer using a second protocol through a virtual request used to construct the client request over the first protocol. A client may use parameters of the first protocol to pass virtual request components to the servicer. A format agreement between the client and the servicer and/or authentication service may allow the servicer and/or authentication service to translate the virtual request components in the client request over the first protocol to one or more second requests using the second protocol. A format agreement may include directions or instructions of how to convert a virtual request using a first request format received through the client request using the first protocol into a second format that may be transmitted over the second protocol. Virtual request components may also prove the authenticity of the virtual request received by the servicer to an authentication service. Once satisfied the virtual request is valid, the authentication service may issue a credential to the servicer to send the one or more second requests to an independent service. A virtual request may be performed with credentials, such as username and password, or through a certificate exchange, such as over a TLS handshake.

Figure 1:
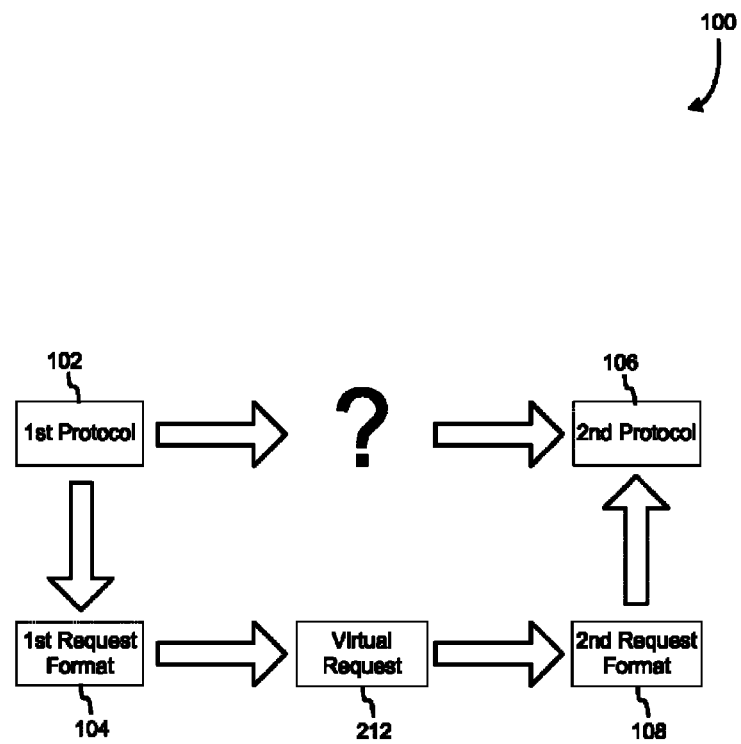
FIG. 1 shows an illustrative diagram of protocol translation using a virtual request in accordance with at least one embodiment.

In some embodiments, this virtual request process forms part of a security model that uses a signing scheme to produce independently verifiable evidence of a client's request. An example of the virtual request environment may be seen in FIG. 2. A servicer 210, which also may be called a request service, can attest to an independent service 214 about a client's intent to make the first request using the evidence in a virtual request 212, such as a client signature. Using the virtual request, a client may make requests using a client that does not support a required signing scheme. The processes and embodiments described herein provide an adaptation to permit the use of a signing scheme with existing clients. This adaptation may be necessary in an environment 100, as seen in FIG. 1, where a direct translation is difficult or not available between a first protocol 102 and a second protocol 106. However, translation from the first protocol 102 to the second protocol 106 may be accomplished by receiving a client request over a first protocol 102 using a first request format 104 containing a virtual request 212, the virtual request defining a mapping from the first request format 104 and a second request format 108. The client request may then be sent using the second request format 108 over the second protocol 106.

Using a pre-arranged format agreement, a transmission of a client request over a first protocol 102 may include virtual request components transmitted in the first protocol 102 according to the first request format 104 as parameters, such as a username, password, session identifier, other parameters or options. In many embodiments, the client request is signed and the signature is stored according to the format agreement using the first request format 104, such as encoded in a password field or included in a certificate exchange receipt. These virtual request components may include at least one time-dependent request component, at least one service-dependent request component, and/or at least one action-dependent request component. Collectively, the virtual request components may make a virtual request. Using the format agreement, the virtual request 212 may be reconstructed into a signed request using the first request format 104. If the signed request is a valid request, the signed request may be used to send the client request in a second request format 108 through a second protocol 106 to an independent service 214, as seen in FIG. 2, which may also be called a provider.

In one embodiment, the first protocol uses credentials, such as a username and password. The virtual request over the first protocol may include one or more virtual request components in the credentials and information transmitted over the protocol to form the virtual request. For example, a client 202 request may be formed from an HTTP request using basic authentication. The requested action, timestamp and other request parameters may be encoded in the URL of the request. The username may be modified to use a public identifier recognized by a servicer 210 or authentication service 204. The password may be modified to include virtual request components, such as a cryptographic digital signature of the HTTP request encoded in hexadecimal using ASCII text. Using a format agreement between the client 202 and servicer, the servicer 210 may construct a signed request from the virtual request. The signed request may be presented to an authentication service 204, such as a credential issuer. The authentication service 204 may validate the signed request and provide client credentials to the servicer 210 if the signed request is valid. Using the client credentials, the servicer 210 may send a second request using a second protocol to an independent service 214.

Figure 2:
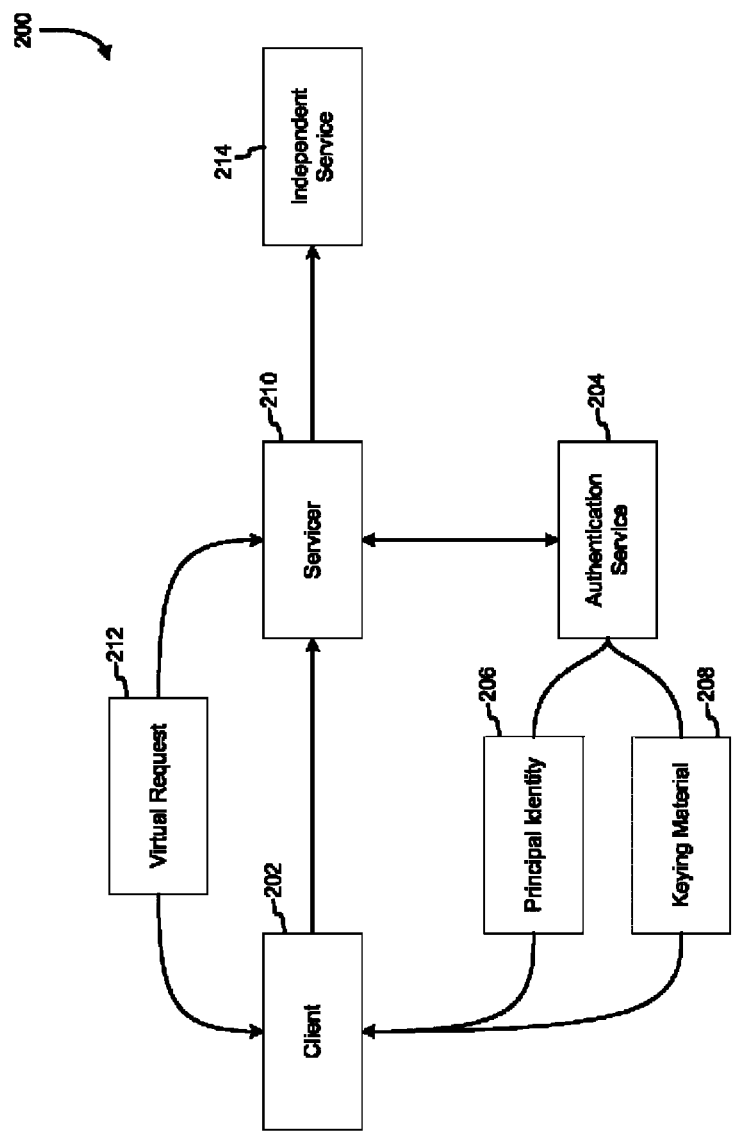
FIG. 2 shows an illustrative example of an environment that may perform credentialed virtual requests in accordance with at least one embodiment.

An example of the embodiment may be seen in FIG. 2, an illustrative example of an environment 200 that may perform credentialed virtual requests in accordance with at least one embodiment. A client 202 may register keying material 208 and a principal identity 206 with an authentication service 204. The client 202 and a servicer 210 may reach a pre-arranged agreement as to the format of a virtual request 212 (or format agreement). The client 202 may sign the virtual request 212 using a signing scheme to produce a temporary set of username-password credentials, such as a public identifier as the username and a digital signature of the request. The client 202 may transmit the temporary credentials to a servicer 210 using an authentication mechanism supported by the client 202, such as for example, HTTP Basic Authentication. The servicer 210 may derive a signed request based at least in part on the virtual request 212 that includes the temporary credentials. The servicer 210 may attest to an authentication service 204 about the client's intent to make the request by providing the signed request as evidence. The authentication service 204 may supply the servicer 210 with an issued credential for calling an independent service 214.

In another embodiment, the first protocol uses a certificate exchange, such as TLS. The virtual request over the first protocol may include one or more virtual request components in the certificate exchange and (if needed) information transmitted over the protocol to form the virtual request. The certificate exchange may be validated by computing a certificate exchange receipt signed by the client 202 and/or servicer. For example, a virtual request may be formed from a TLS handshaking procedure and transmission over TLS. Parameters of the handshaking procedure may be used to transmit virtual request components. The servicer 210 may include an X.509 certificate whose subject is the DNS name of the servicer 210 to the client. A TLS session identifier may identify an action. The client 202 may also present a digital identity certificate to identify itself during the certificate exchange. The client 202 and servicer 210 may mutually compute a certificate exchange receipt based at least in part on the certificate exchange session. The servicer 210 may then present the certificate exchange receipt to a servicer. Using a format agreement between the servicer 210, authentication service 204 and/or client 202, the authentication service 204 may determine the validity of the request. If the exchange receipt is a valid request, the authentication service 204 may send a client credential to the servicer. The servicer 210 may then use the client credential to make the second request.

Figure 3:
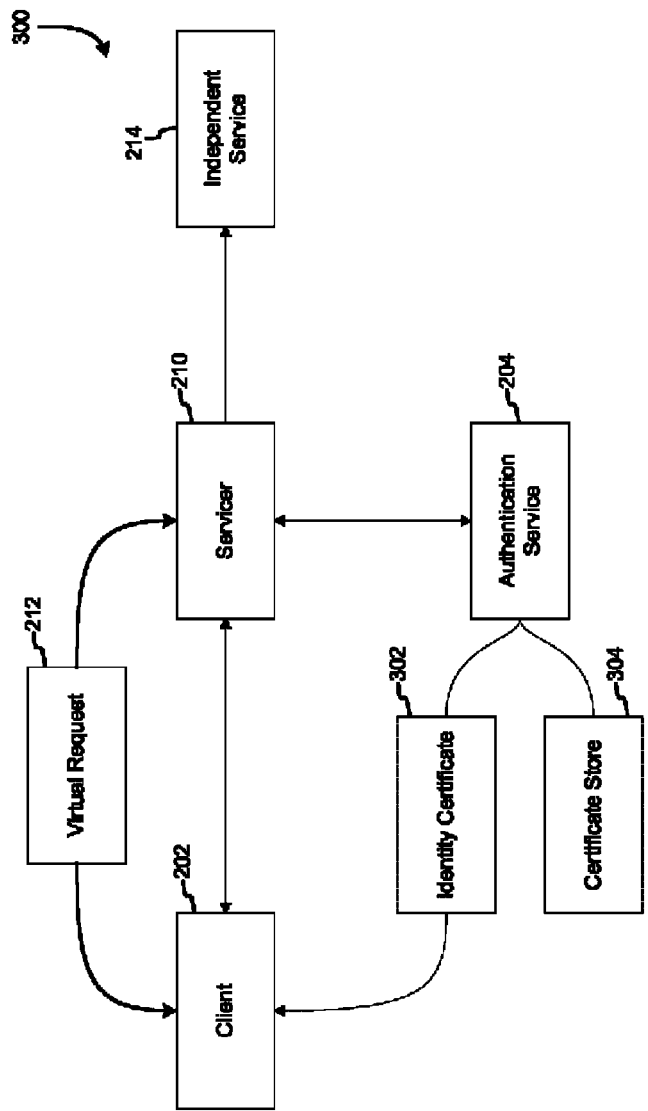
FIG. 3 shows an illustrative example of an environment that may perform virtual requests through a certificate exchange in accordance with at least one embodiment.

An example of the embodiment may be seen in FIG. 3, an illustrative example of an environment that may perform virtual requests through a certificate exchange in accordance with at least one embodiment. A client 202 may register a digital identity certificate 302 with an authentication service 204. The authentication service 204 may store the identity certificate 302 as associated with the client 202 in a certificate store 304. The client 202 may establish a certificate exchange session with a servicer 210, such as for example, a TLS handshake. The servicer 210 may inject one or more virtual request components into the certificate exchange session to form a virtual request 212. The client 202 may present the digital identity certificate 302 to the servicer 210. The client 202 and servicer 210 may mutually compute a certificate exchange receipt based at least in part on messages from the certificate exchange session including the virtual request 212. The servicer 210 may attest to the authentication service 204 about the client's intent to make the request providing the certificate exchange receipt as evidence. The authentication service 204 may supply the servicer 210 with an issued credential for calling an independent service 214.

Both the credential-based and certificate exchange-based virtual request environments and procedures provide a security model for using a signing scheme to produce independently-verifiable evidence of a client's request using a first protocol. The credential-based procedure will be described first and then the certificate-based procedure will be described.

Figure 4:
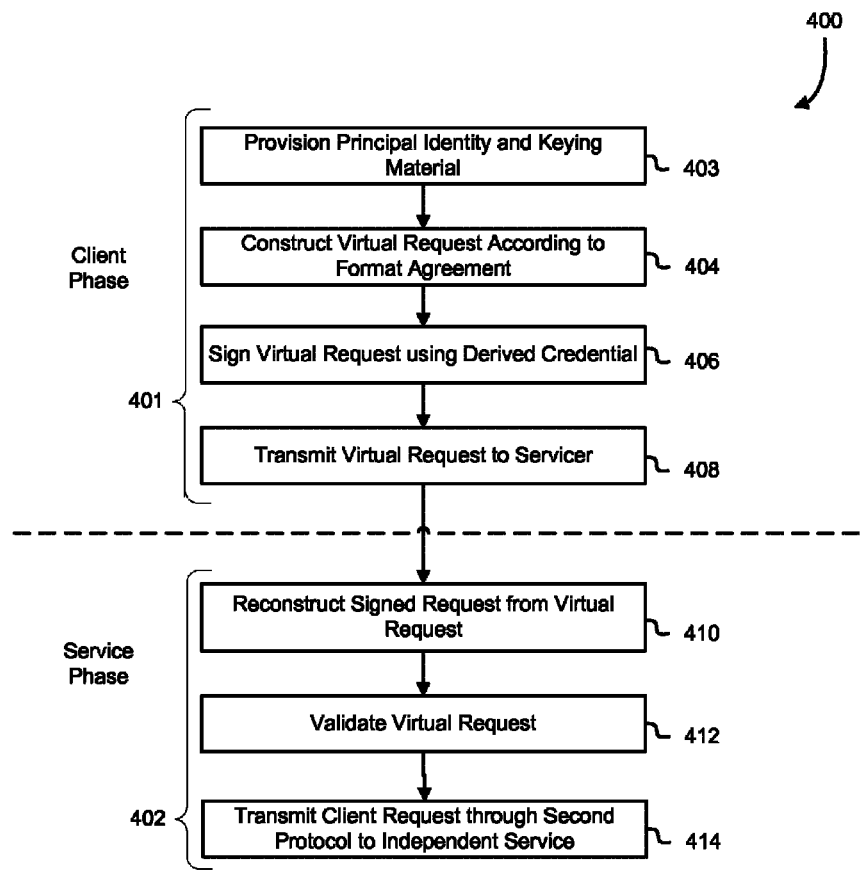
FIG. 4 shows an illustrative example of a process that may be used to perform credentialed virtual requests in accordance with at least one embodiment.

In FIG. 4, an illustrative example of a process that may be used to perform credentialed virtual requests in accordance with at least one embodiment is shown. In a credential-based procedure embodiment, a process 400 of using a credentialed virtual request may contain seven operations: setup 403, construction 404, signing 406, transmission 408, reconstruction 410, validation 412 and performance 414. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. The operations of the method are discussed in relation to a specific embodiment having an order; however, it should be recognized that some or all operations may be performed out-of-order or in parallel. The process of FIG. 4 may be performed in an environment like FIG. 2, where a client 202, servicer 210 and authentication service 204 communicate to send a client request to an independent service 214 by a virtual request 212. The setup 403, construction 404, signing 406 and transmission 408 operations may be performed by a client 202 during a client phase 401. The reconstruction 410, validation 412 and performance 414 operations may be performed by a servicer 210 during a service phase.

During a setup operation 403, a client 202 may provision a principal identity 206 and keying material 208 for the identity 206 with an authentication service 204. The keying material 208 may be used in the construction of a signature, the signature used to sign a client request. In some embodiments, the keying material 208 may be a public-private key pair for an asymmetric key cryptography system. The client 202 may possess the private key and the authentication service 204 may possess the public key for the principal identity. In other embodiments, the keying material 208 may be a shared secret, such as in a symmetric key cryptography system.

During the construction operation 404, the client 202 may construct a virtual request according to a pre-arranged request format agreement with a servicer using a first request format 104. The virtual request may include at least one time-dependent request component, at least one service dependent request component, and/or at least one action-dependent request component. A time dependent request component may include a time stamp, date stamp, sequence number, or other mechanism for associating the request with a determined moment of time. A service-dependent request component may include a service identifier, moniker, hostname, or other mechanism for associating the request with the servicer. An action-dependent request component may include a request path, request parameter, action string, query string, URI, or other mechanism for associating the request with a specific action the client 202 intends to perform.

During the signing operation 406, the client 202 may apply the keying material to the virtual request according to a signing scheme to produce a virtual request signature. In one embodiment, the client 202 may derive a credential based at least in part on the principal identity and virtual request signature. For example, the client 202 may apply the keying material to the virtual request by, for example, calculating a hash-based message authentication code (HMAC) as described below. The client 202 may derive a signing key from the key material 208 using a key derivation function. In some embodiments the key derivation function may incorporate one or more request components from the virtual request. The client 202 may calculate an HMAC using a secure cryptographic hash function, such as SHA-2 (secure hash algorithm), using the signing key as the HMAC key and the virtual request as the HMAC message. The client 202 may derive a credential by constructing a username-password credential with the username based at least in part on the principal identity and the password based at least in part on the virtual request signature. For example, the username may be a globally unique identifier (GUID) associated with the principal identity and the password may be a hexadecimal encoding of the virtual request signature.

During the transmission operation 408, the client 202 may transmit the claim, such as the username and password, to a servicer 210 as part of a service request. While the word claim may be used herein, it should be recognized that a claim set comprising multiple claims may be equally applicable. In one embodiment, the client 202 may transmit the at least one time-dependent request component, at least one service-dependent request component, and/or at least one action-dependent request component to the servicer 210 as part of the service request. For example, the client 202 may establish an HTTPS connection with the servicer 210 and communicate the claim to the servicer 210 using HTTP Basic Authentication. The client 202 may transmit virtual request components to the servicer 210 using HTTP actions, URI's, query parameters, hash fragments, or other transmission protocol features. In some embodiments the credential may include plaintext copies of one or more request components. Plaintext copies may be used to communicate request components to a service when the communication protocol does not otherwise support incorporating equivalent information. For example, if the at least one time-dependent request component includes a time stamp and the transmission protocol does not support transmitting a time stamp, the credential may include the time stamp by formatting the credential password as the concatenation of a plaintext copy of the time stamp and the virtual request signature.

During the reconstruction operation 410, the servicer 210 may reconstruct the virtual request. The servicer 210 may derive a signed request according to the signing scheme based at least in part on the virtual request and the claim. The servicer 210 may reconstruct the virtual request using the received request components from the service request. The servicer 210 may derive a signed request by, for example, assembling the virtual request that includes the virtual request signature to form a signed request. For example, if a claim included the request signature as a hexadecimal encoded password, the password may be unencoded to translate back to the request signature.

During the validation operation 412, the servicer 210 may present the signed request to the authentication service 204 to obtain an issued credential for calling an independent service 214. In one embodiment, the authentication service 204 may validate the freshness of the signed request by examining time-dependent request components. In another embodiment, the authentication service 204 may validate the bearer of the signed request by examining service-dependent request components. In some embodiments, the authentication service 204 may validate the authenticity of the signed request by, for example, confirming the virtual request signature using the public key for the principal identity. In other embodiments the issued credential may be constrained based on the request components. For example, the issued credential may be limited to performing specific functions determined by examining action-dependent request components.

During the performance operation 414, the servicer 210 may call the independent service 214 using the issued credential. The request may be provided in a second protocol that is different from the first protocol. The difference may be different versions of the same protocol, different subsets of the same protocol or different protocols altogether. In one embodiment, the credential may be a token that is bound to the servicer credentials, proving authorization of the servicer to provide the client request to the independent service. In another embodiment, the issued credentials may be a certificate that allows the servicer to sign one or more client requests. In some embodiments, the servicer 210 may send the request to the independent service 214 through an application programmer's interface (API).

Figure 5:
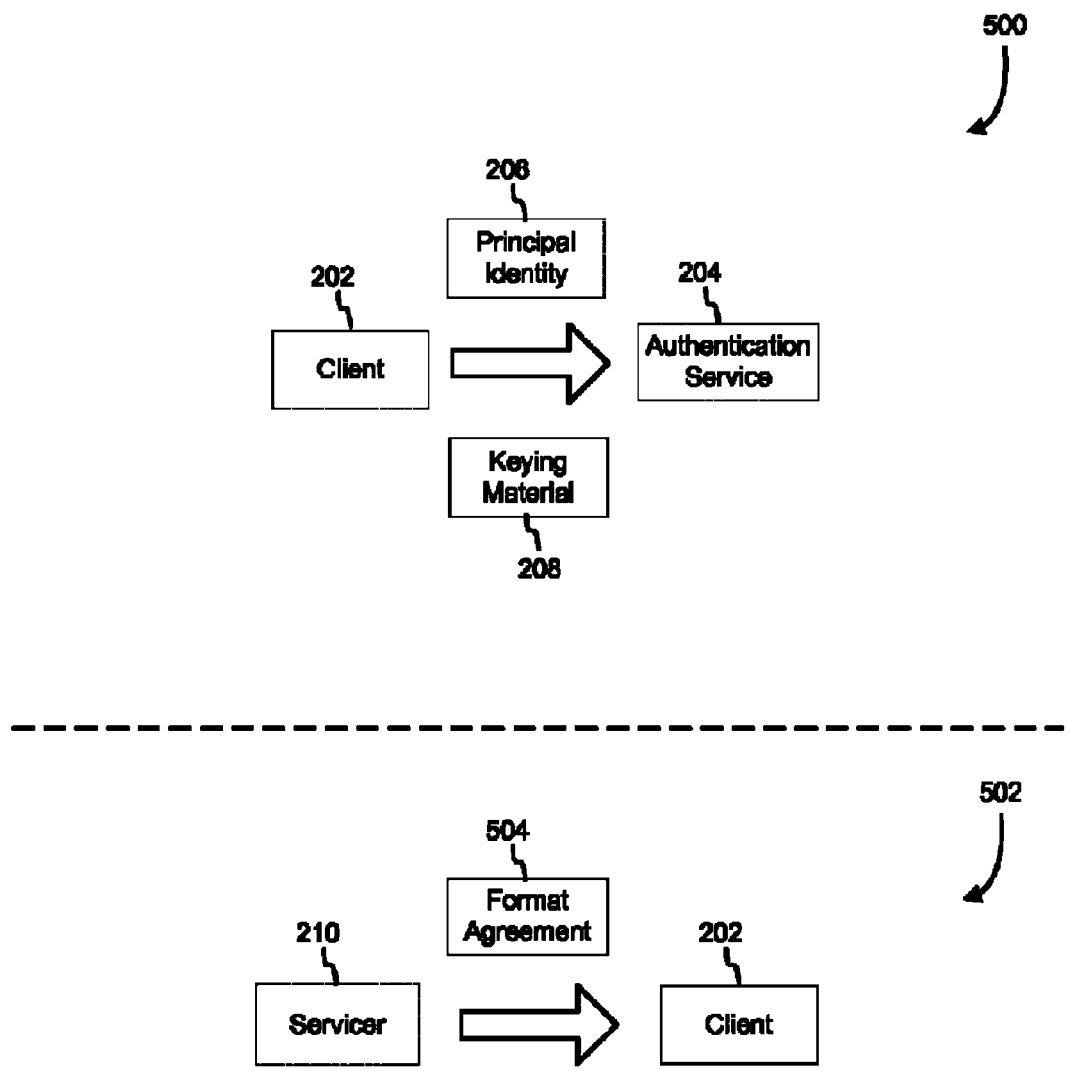
FIG. 5 shows an illustrative diagram of a credentialed virtual request setup in accordance with at least one embodiment.

Turning now to FIG. 5, an illustrative diagram of a credentialed virtual request setup in accordance with at least one embodiment is shown. In a credentialed virtual request, a client 202 may need to perform two setup procedures: an authentication service setup 500 and a servicer setup 502. In the authentication service setup 500, the client may communicate to an authentication service 204 an association between a principal identity 206 and keying material 208. The identity and keying material may be used to form proof that a servicer 210 has received a signed request from the client 202. In one embodiment of the servicer setup 502, a servicer 210 may communicate a virtual request format agreement 504 to a client 202. In another embodiment of the servicer setup 502, the format agreement 504 may be agreed to in advance and not transmitted between the servicer 210 and client 202. The format agreement 504 may allow the servicer 210 to reconstruct a signed request from a virtual request.

Figure 6:
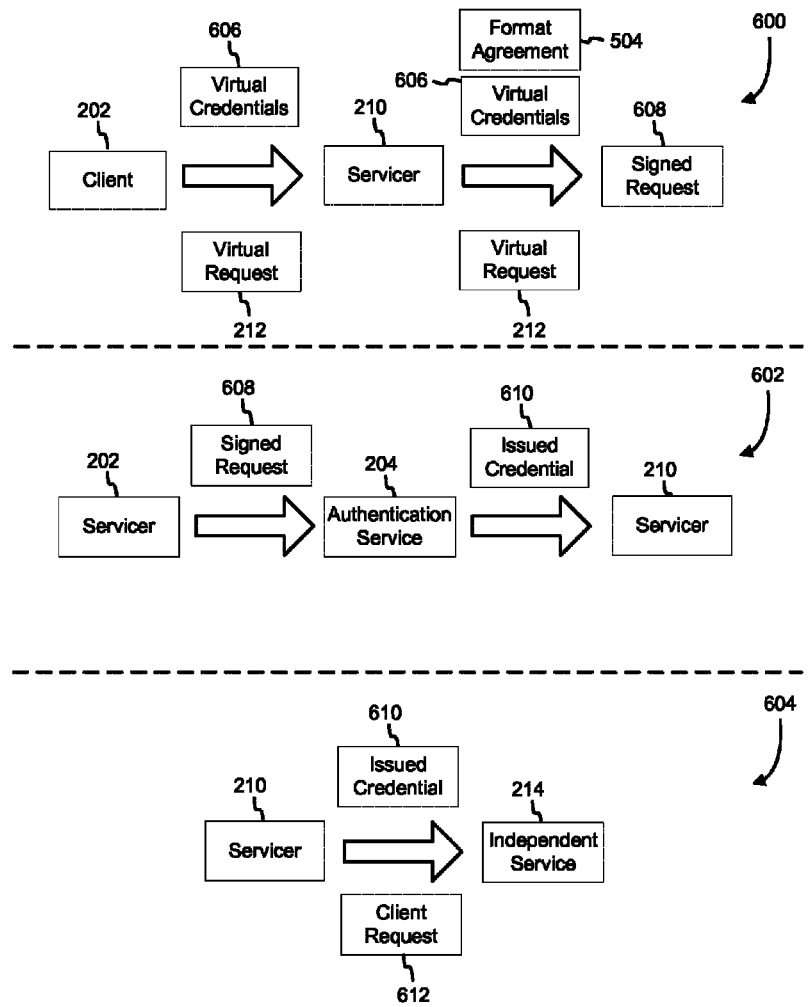
FIG. 6 shows an illustrative diagram of credentialed virtual request messaging in accordance with at least one embodiment.

Turning now to FIG. 6, an illustrative diagram of credentialed virtual request messaging in accordance with at least one embodiment is shown. The messaging may be performed in an environment similar to FIG. 2. The virtual request messaging may be viewed as three different phases: a virtual request phase 600, a validation phase 602 and a performance phase 604. In the virtual request phase 600, a client 202 may send a virtual request 212 that includes virtual request components such as virtual credentials 606 to servicer 210 over a first protocol. Using the format agreement 504 received in the setup shown in FIG. 5, the servicer 210 may reconstruct a signed request 608 from the virtual request 212 including the virtual credentials 606. In the validation phase 602, a servicer 202 may transmit the reconstructed signed request 608 to an authentication service 204 for validation. If the authentication service 204 determines the signed request 608 is valid, the authentication service may issue credentials 610 to the servicer 210. The issued credentials may provide proof of authorization of the servicer 210 to communicate a client request to an independent service 214. During the performance phase 604, the servicer 210 may provide the issued credential 610 and a client request 612 corresponding to the virtual request 212 to an independent service 214 for performance over a second protocol.

Figure 7:
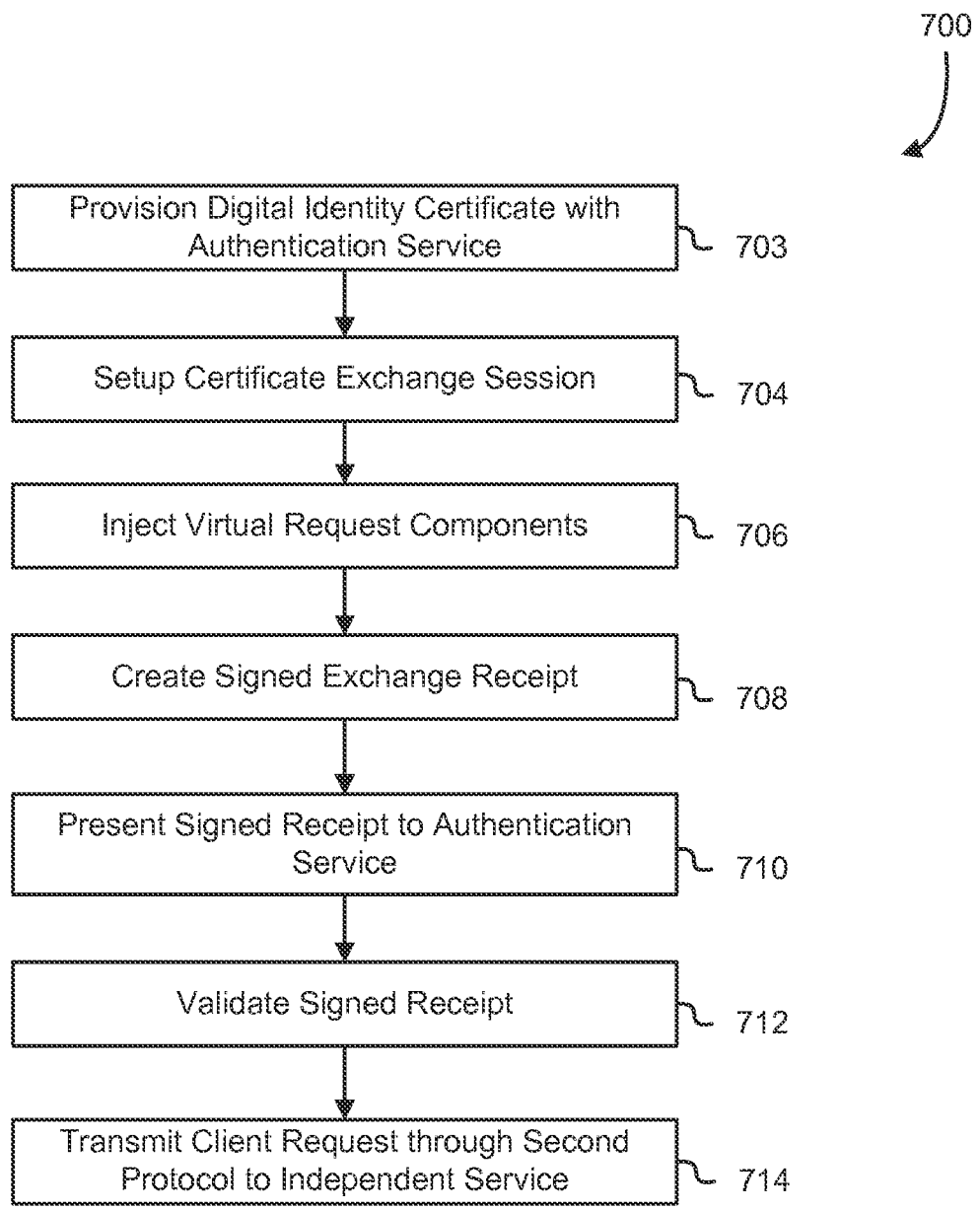
FIG. 7 shows an illustrative example of a process that may be used to perform virtual requests through a certificate exchange in accordance with at least one embodiment.

Turning now to the certificate-based procedure, in one embodiment, the process 700 of performing virtual requests through a certificate exchange may contain seven operations: provisioning 703, setup 704, injection 706, signing 708, presentation 710, validation 712 and performance 714. The operations of the method are discussed in relation to a specific embodiment having an order, however, it should be recognized that some or all operations may be performed out-of-order or in parallel. In FIG. 7, an illustrative example of a process that may be used to perform virtual requests through a certificate exchange in accordance with at least one embodiment is shown. The process of FIG. 7 may be performed in an environment like FIG. 3, where a client 202, servicer 210 and authentication service 204 communicate to send a client request to an independent service 214 by a virtual request 212.

During the provisioning operation 703, a client 202 may provision a digital identity certificate with an authentication service 204. The authentication service 204 may record the identity certificate and mapping to a principal identity in a certificate store. For example, the digital identity certificate may be an X.509 public key certificate. The client 202 may possess the private key and the authentication service 204 may possess the public key for the certificate.

During the setup operation 704, the client 202 may establish a certificate exchange session with a servicer. In some embodiments, the certificate exchange session may include at least one time-dependent request component, at least one service-dependent request component, and/or at least one action-dependent request component. A time-dependent request component may include a time stamp, date stamp, sequence number, or other mechanism for associating the request with a determined moment of time. A service-dependent request component may include a service identifier, moniker, hostname, or other mechanism for associating the request with the servicer. An action-dependent request component may include a request path, request parameter, action string, query string, URI, or other mechanism for associating the request with a specific action the client 202 intends to perform. The certificate exchange session may include one or more handshake portions with one of the one or more handshake portions including one or more virtual request components. Virtual request components may include one or more of: time-dependent request components, service-dependent request components, or action-dependent request components.

The client 202 and/or servicer 210 may transmit one or more virtual request components as part of the certificate exchange. The client 202 may transmit one or more time-dependent request components in a handshake portion. The client 202 may also transmit an unpredictable client nonce, such as a random sequence of bytes, in a handshake portion. The servicer 210 may transmit one or more time-dependent request components in a handshake portion. The servicer 210 may transmit an unpredictable server nonce, such as an independently chosen second random sequence of bytes, in a handshake portion. The servicer 210 may transmit at least one service-dependent request components, such as a digital identity certificate, in a handshake portion. For example, the client 202 may establish an HTTPS connection with the servicer 210 and use TLS to negotiate a certificate exchange session by beginning a TLS handshaking procedure. The client 202 may transmit a time stamp and random sequence of bytes to the servicer. The servicer 210 may transmit a time stamp, a random sequence of bytes, and an X.509 certificate where the subject of the certificate is the DNS name of the servicer 210 to the client 202.

During the injection operation 706, the servicer 210 may include one or more virtual request components in the certificate exchange session. The servicer 210 may construct a virtual request according to a pre-arranged request format agreement with the authentication service 204. The servicer 210 may transmit at least a portion of the virtual request in a handshake portion. In one embodiment, the servicer 210 may construct a virtual request containing one or more service-dependent request components and/or one or more action-dependent request components. For example, the servicer 210 may construct a TLS session identifier based at least in part on the at least one action-dependent request component. The servicer 210 may transmit the session identifier to the client 202 as part of the TLS handshake.

During the signing operation 708, the client 202 may present the digital identity certificate to the servicer 210 through the certificate exchange session. The client 202 and servicer 210 may mutually compute a certificate exchange receipt based at least in part on messages from the certificate exchange session. In one embodiment, the client 202 may transmit the digital identity certificate to the servicer 210 in a handshake portion. The client 202 may transmit a handshake verification to the servicer 210 in a handshake portion. For example, the client 202 may calculate the handshake verification using a secure cryptographic hash function, such as SHA-1, using the client's digital identity certificate private key as the HMAC key and selecting one or more handshake portions to sign as the HMAC message. The signed handshake portions, or exchange receipt, may include at least: the at least one virtual request component, the at least one time-dependent request component, the at least one service-dependent request component, the at least one action-dependent request component, the client nonce, and/or the server nonce.

During the presentation operation 710, the servicer 210 may present the certificate exchange receipt to the authentication service 204 to obtain an issued credential for calling an independent service 214. The servicer 210 may construct the certificate exchange receipt based at least in part on the signed handshake portions and the handshake verification. The servicer 210 may sign at least part of the certificate exchange receipt, for example using a private key for a digital identity certificate owned by the servicer. The servicer 210 may provide the authentication service 204 with the certificate exchange receipt, a principal identity for the client, and a principal identity for the servicer.

During the validation operation 712, the authentication service 204 may validate the signature on the certificate exchange receipt, for example by retrieving principal identity for the servicer 210 using the public key of the servicer 210 and verifying the public key in the certificate exchange receipt. The authentication service 204 may validate the handshake verification, for example by retrieving a principal identity for the client 202 using the public key in the certificate exchange session and verifying the public key with the signed handshake portions. The authentication service 204 may validate the freshness of the certificate exchange receipt by examining time-dependent request components included in the signed handshake portions. The authentication service 204 may validate the bearer of the certificate exchange receipt by examining service-dependent request components included in the signed handshake portions. For example, the authentication service 204 may validate that the service-dependent request components match the digital identity certificate retrieved to validate the certificate exchange receipt. In some embodiments the issued credential may be constrained based on the request components. For example, the issued credential may be limited to performing specific functions determined by examining action-dependent request components included in the signed handshake portions.

During the performance operation 714, the servicer 210 may call the independent service 214 using the issued credential. The client request may be provided in a second protocol that is different from the first protocol. The difference may be different versions of the same protocol, different subsets of the same protocol or different protocols altogether. In one embodiment, the credential may be a token that is bound to the servicer credentials, proving authorization of the servicer to provide the client request to the independent service. In another embodiment, the issued credentials may be a certificate that allows the servicer to sign one or more client requests. In some embodiments, the servicer 210 may send the request to the independent service 214 through an application programmer's interface (API).

The presentation operation 710 and validation operation 712 may be performed in a few variations. In one embodiment, a message from the servicer 210 to the authentication service 204 may be signed with the same private key as the exchange receipt. The servicer may verify the signature against a known public key, validate the authorization by the client in the exchange receipt and then provide the issued credentials. In another embodiment, the servicer 210 may negotiate a secure connection with the authentication service 204 using a public certificate associated with the servicer 210. The authentication service 204 may verify the public certificate is the same certificate (or has the same identity behind it) as was used in the exchange receipt and validate the authorization by the client in the exchange receipt. If so, the issued credentials may be presented over the secure connection. In another embodiment, the servicer 210 may provide the exchange receipt to the authentication service 204. The authentication service may validate the authorization by the client in the exchange receipt, encrypt the credential using the servicer certificate associated with the exchange receipt and send the encrypted credentials to the servicer 210. The servicer 210 may then decrypt the credentials using its private key.

Figure 8:
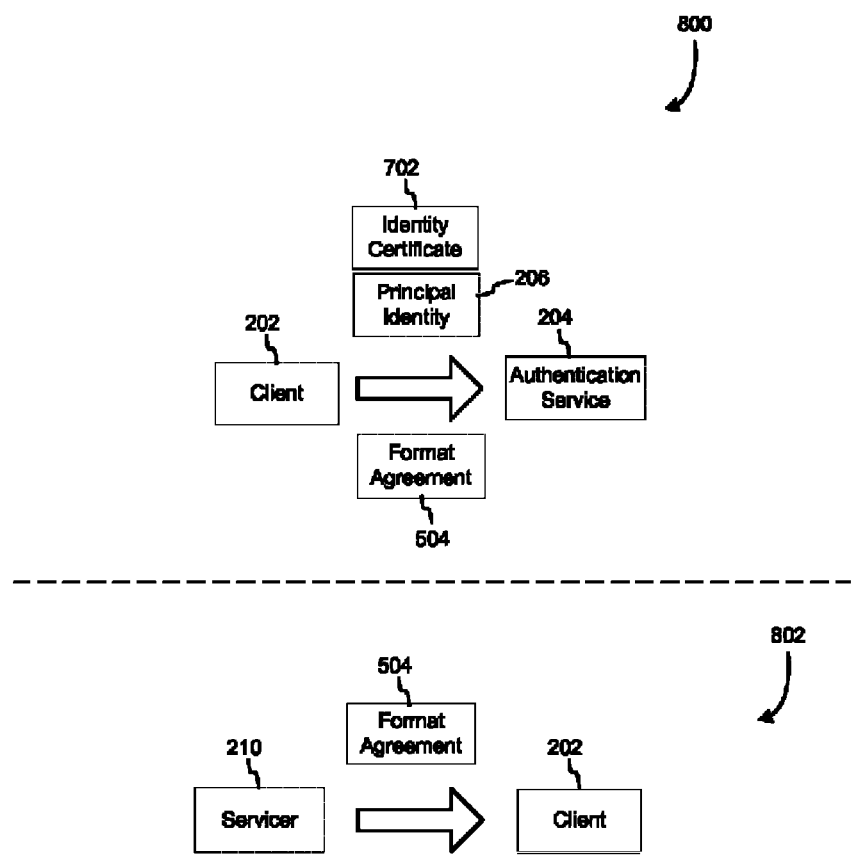
FIG. 8 shows an illustrative diagram of a setup of virtual requests through a certificate exchange in accordance with at least one embodiment.

Turning now to FIG. 8, an illustrative diagram of a setup of virtual requests through a certificate exchange in accordance with at least one embodiment is shown. In one embodiment of a client-authentication service setup 800, a client 202 discloses an association of an identity certificate 702 with the principal identity 206 of the client. This disclosure may allow the authentication service 204 to determine the owner of material signed by the identity certificate 702. In one embodiment of a servicer-client setup 802, the servicer 210 may also disclose a format agreement 504 of virtual requests, such that the client 202 may construct a client request from a virtual request which may be contained in a certificate exchange receipt. In another embodiment of the servicer-client setup 802, the format agreement 504 may be agreed to in advance and not transmitted between the servicer 210 and client 202.

Figure 9:
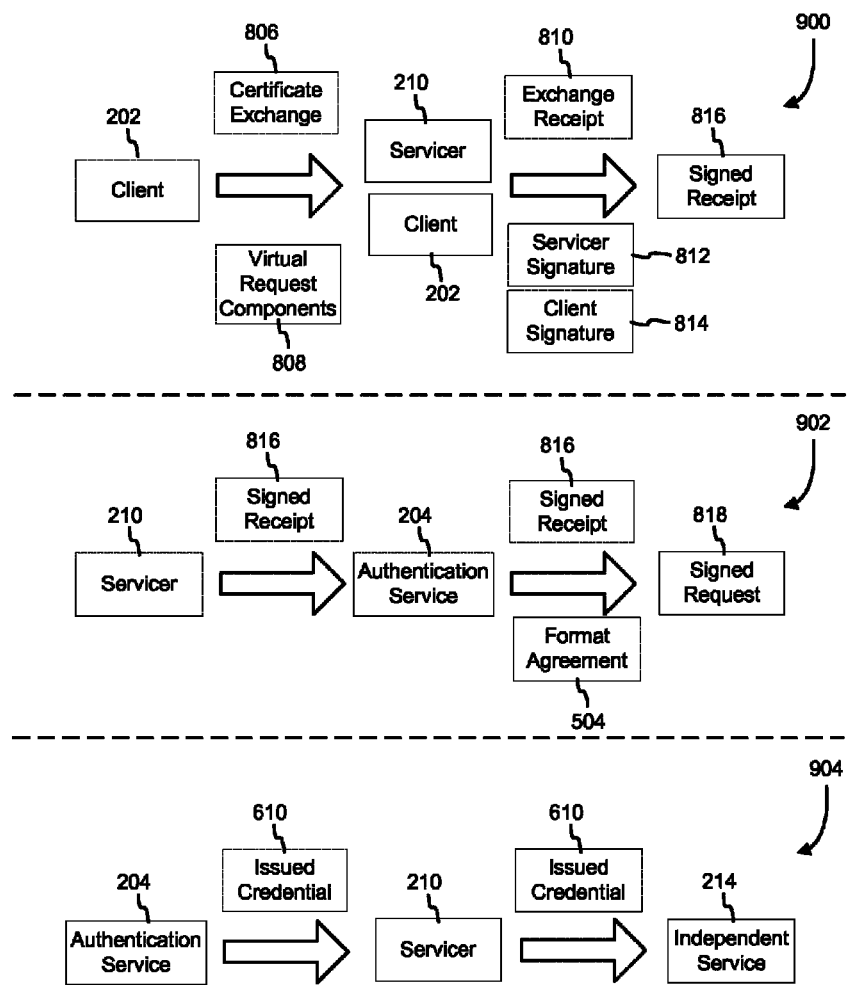
FIG. 9 shows an illustrative diagram of messaging in performing virtual requests through a certificate exchange in accordance with at least one embodiment.

Turning now to FIG. 9, an illustrative diagram of messaging in performing virtual requests through a certificate exchange in accordance with at least one embodiment is shown. The messaging process may be viewed in three phases: exchange receipt formation 900, validation 902 and performance 904. During exchange receipt formation 900, a client 202 may initiate a certificate exchange 806, such as TLS, between the client 202 and the servicer 210. The servicer 210 and/or client 202 may insert virtual request components 808 into the certificate exchange 806, such as during a handshake portion of the certificate exchange. After inserting the virtual request components, an exchange receipt 810 is formed using the history of the certificate exchange 806 that includes the virtual request components 808. The servicer 210 may sign the exchange receipt 810 to form a servicer signature 812. The client may also sign the exchange receipt 810 to form a client signature 814. The signing of the exchange receipt 810 forms a signed receipt 816. By signing the exchange receipt 810, the client provides proof of the origination of the virtual request with the client.

During validation 902, the servicer 210 provides the signed receipt 816 to the authentication service 204. Using the format agreement 504 received previously (as seen in FIG. 8), the servicer 210 may reconstruct a signed request 818 from the virtual request 212 contained in the signed exchange receipt 816. The authentication service 204 may then validate the signed request 818. During performance 904 and upon validation of the signed request 818, the authentication service 204 may provide an issued credential 610 to the servicer 210. The servicer 210 may provide the issued credential 610 and perform a client request corresponding to the virtual request 212 to an independent service 214 for performance over a second protocol. The servicer may determine the actual client request from the signed receipt or from instructions received from the authentication service. In one embodiment, the servicer 210 uses a format agreement 504 from the client 202 to reconstruct a client request from the signed receipt 816. In another embodiment, the authentication service 204 determines a client request from the signed receipt 816. Once the signed receipt is validated, the authentication service may return the client request and issued credentials to the servicer 210.

Figure 10:
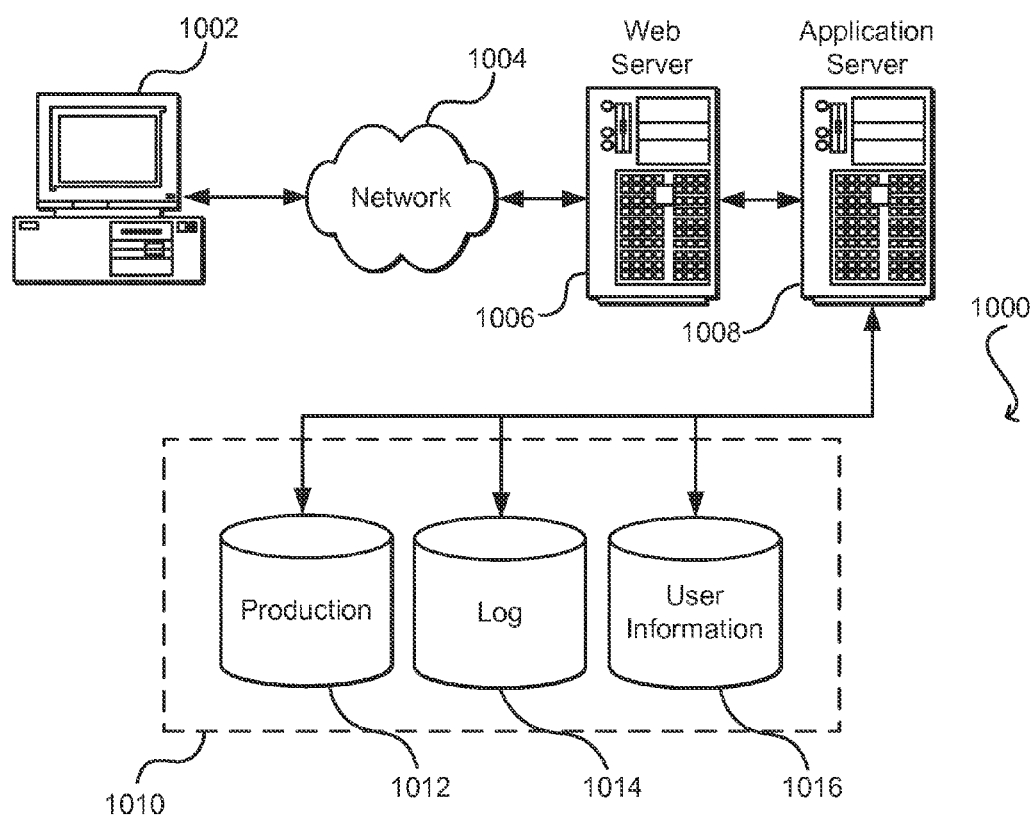
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a client of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the client, which may be served to the client by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising a servicer computer configured to:
   cause an authentication service computer to store a digital identity certificate of a client computer, the client computer configured to generate the digital identity certificate based at least in part on a private key associated with the client computer;
   cause the authentication service computer to determine a validity of the digital identity certificate based at least in part on a public key associated with the digital identity certificate;
   initiate a certificate exchange session utilizing a transport layer security (TLS) protocol with the client computer, the certificate exchange session comprising a handshake portion that includes a time-dependent request component, a service-dependent request component, and an action-dependent request component, the action-dependent request component comprising an association between a request of the certificate exchange session and an action the client computer is requested to perform;
   enable the client computer to transmit the digital identity certificate to the servicer computer;
   compute a servicer certificate exchange receipt based at least in part on the certificate exchange session; and
   cause the client computer to compute a client certificate exchange receipt based at least in part on the certificate exchange session.

2. The system of claim 1, wherein the servicer computer is further configured to:
   transmit the servicer certificate exchange receipt or the client certificate exchange receipt to the authentication service computer; and
   when at least one of the client certificate exchange receipt or the servicer certificate exchange receipt is validated, cause the authentication service computer to transmit an issued credential to the servicer computer, the issued credential used to communicate with an independent service on behalf of the client computer.

3. The system of claim 2, wherein the servicer computer is further configured to:
   cause the authentication service computer to validate a signature of the servicer certificate exchange receipt by retrieving a principal identity for the servicer computer using a public key associated with the servicer computer; and
   cause the authentication service computer to verify the public key associated with the servicer computer.

4. The system of claim 3, wherein the servicer computer is further configured to:
   cause the authentication service computer to verify the public key associated with the servicer computer by comparing the time-dependent request component with a current time.

5. The system of claim 3, wherein the servicer computer is further configured to:
   cause the authentication service computer to verify the public key associated with the servicer computer by matching the service-dependent request component with the digital identity certificate of the client computer.

6. The system of claim 1, wherein the authentication service computer is configured to store the digital identity certificate of the client computer in a certificate store.

7. A system, comprising a client computer configured to:
   generate a digital identity certificate based at least in part on a private key associated with the client computer;
   cause an authentication service computer to store the digital identity certificate of the client computer;
   cause the authentication service computer to determine a validity of the digital identity certificate based at least in part on a public key associated with the digital identity certificate;
   cause a servicer computer to initiate a certificate exchange session utilizing a transport layer security (TLS) protocol with the servicer computer, the certificate exchange session comprising a handshake portion that includes a time-dependent request component, a service-dependent request component, and an action-dependent request component, the action-dependent request component comprising an association between a request of the certificate exchange session and an action the client computer is requested to perform;
   transmit the digital identity certificate to the servicer computer;
   compute a client certificate exchange receipt based at least in part on the certificate exchange session; and
   cause the servicer computer to compute a servicer certificate exchange receipt based at least in part on the certificate exchange session.

8. The system of claim 7, wherein the client computer is further configured to:
   transmit to the servicer computer, from the client computer, the digital identity certificate in the handshake portion; and
   transmit to the servicer computer, from the client computer, a handshake verification associated with the handshake portion.

9. The system of claim 8, wherein the handshake verification is calculated using a secure cryptographic hash function using the private key associated with the client computer as a hash-based message authentication code (HMAC) key.

10. The system of claim 7, wherein the client computer is further configured to:
    receive a format agreement from the servicer computer at the client computer, the format agreement including instructions to convert a first request using a first protocol to a second request using a second protocol, wherein the first request is directed to an independent service on behalf of the client computer.

11. The system of claim 10, wherein the client computer is further configured to:
    sign the format agreement, wherein the format agreement includes at least one of the time-dependent request component, the service-dependent request component, or the action-dependent request component.

12. A system, comprising an authentication service computer configured to:
    receive a digital identity certificate of a client computer, the client computer configured to generate the digital identity certificate based at least in part on a private key associated with the client computer;

store the digital identity certificate of a client computer;

determine a validity of the digital identity certificate based at least in part on a public key associated with the digital identity certificate;

cause a servicer computer to initiate a certificate exchange session utilizing a transport layer security (TLS) protocol with the client computer, the certificate exchange session comprising a handshake portion that includes a time-dependent request component, a service-dependent request component, and an action-dependent request component, the action-dependent request component comprising an association between a request of the certificate exchange session and an action the client computer is requested to perform;

cause the servicer computer to enable the client computer to transmit the digital identity certificate to the servicer computer;

cause the client computer to compute a client certificate exchange receipt based at least in part on the certificate exchange session; and cause the servicer computer to compute a servicer certificate exchange receipt based at least in part on the certificate exchange session.

13. The system of claim 12, wherein the authentication service computer is further configured to:

store a mapping to a principal identity with the digital identity certificate of the client computer.

14. The system of claim 12, wherein the authentication service computer is further configured to:

verify the public key associated with the servicer computer by comparing the time-dependent request component with a current time.

15. The system of claim 12, wherein the authentication service computer is further configured to:

verify the public key associated with the servicer computer by matching the service-dependent request component with the digital identity certificate of the client computer.

16. The system of claim 12, wherein the time-dependent request component includes a time stamp, a date stamp, or a sequence number.

17. The system of claim 12, wherein the service-dependent request component includes a service identifier, a moniker, or a hostname.

18. The system of claim 12, wherein the action-dependent request component includes a request path, a request parameter, an action string, or a query string.

19. The system of claim 12, wherein the digital identity certificate is an X.509 public key certificate.

\* \* \* \* \*